(12) United States Patent
Pang et al.

(10) Patent No.: US 12,360,674 B2
(45) Date of Patent: Jul. 15, 2025

(54) DISTRIBUTED WRITE DESTAGING

(71) Applicant: Dell Products L.P., Round Rock, TX (US)

(72) Inventors: Lixin Pang, Needham, MA (US); Rong Yu, West Roxbury, MA (US); Ramesh Doddaiah, Westborough, MA (US); Shao Kuang Hu, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 304 days.

(21) Appl. No.: 18/104,392

(22) Filed: Feb. 1, 2023

(65) Prior Publication Data
US 2024/0256133 A1 Aug. 1, 2024

(51) Int. Cl.
*G06F 3/06* (2006.01)
(52) U.S. Cl.
CPC .......... *G06F 3/0611* (2013.01); *G06F 3/0659* (2013.01); *G06F 3/067* (2013.01)

(58) Field of Classification Search
CPC ...... G06F 3/0611; G06F 3/067; G06F 3/0659; G06F 3/061
See application file for complete search history.

(56) References Cited

U.S. PATENT DOCUMENTS

2018/0004452 A1* 1/2018 Ganguli .............. H04L 41/5025

* cited by examiner

*Primary Examiner* — Hiep T Nguyen
(74) *Attorney, Agent, or Firm* — Krishnendu Gupta; Nikhil Patel

(57) ABSTRACT

One or more aspects of the present disclosure relate to distributing write destaging amongst a storage array's boards. In embodiments, an input/output (IO) workload is received at a storage array. In addition, a write IO request in the IO workload is directed to a target board of a plurality of boards of the storage array based on one or more performance-related hyperparameters of each board. Further, write data of the write IO request to a storage device is destaged by the target board.

18 Claims, 5 Drawing Sheets

DISTRIBUTED WRITE DESTAGING

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to distributing write destaging amongst a storage array's boards. In embodiments, an input/output (IO) workload is received at a storage array. In addition, a write IO request in the IO workload is directed to a target board of a plurality of boards of the storage array based on one or more performance-related hyperparameters of each board. Further, write data of the write IO request to a storage device is destaged by the target board.

In embodiments, a shared local memory can be established for each board of the plurality of boards. Additionally, each board's emulations can access their corresponding board's local memory.

In embodiments, a shared board-level memory can be established between each of the plurality of boards. Further, a data services (DS) emulation and disk adapter (DA) of each of the plurality of boards can be enabled to access the shared board-level memory.

In embodiments, a local synchronous write destage (LSWD) queue can be established for each of the plurality of boards. In addition, the IO write request can be queued in the LSWD corresponding to a subject board of the plurality of boards that received the IO write request.

In embodiments, one or more performance-related hyperparameters corresponding to a disk adapter (DA) emulation of the subject board can be determined. Additionally, one or more performance-related hyperparameters corresponding to the DA emulation of each of the plurality of boards can be determined.

In embodiments, a fabric utilization corresponding to the subject board and each of the plurality of boards can be measured.

In embodiments, a DA emulation memory utilization corresponding to the subject board and each of the plurality of boards can be measured. Additionally, a DA emulation processor cycle utilization corresponding to the subject board and each of the plurality of boards can be measured.

In embodiments, a write destage schedule based on the measured fabric utilization, DA emulation memory utilization, and DA emulation processor cycle utilization corresponding to the subject board, and each of the plurality of boards can be generated.

In embodiments, a destage controller corresponding to the subject board can be used to assign the DA corresponding to the subject board to destage write data corresponding to the write IO request based on the write destage schedule. For example, the subject board can correspond to the target board. Additionally, the write IO request can be passed to the DA emulation of the subject board, or the write IO request can be stored in the LSWD queue in a shared memory of the subject board based on the measured fabric utilization, DA emulation memory utilization, and DA emulation processor cycle utilization corresponding to the subject board.

In embodiments, a destage controller corresponding to the subject board can assign a remote board of the plurality of boards to destage write data corresponding to the write IO request based on the write destage schedule. Additionally, a pointer to the write IO request corresponding to a location in a shared memory of the subject board can be passed to shared board-level memory between each of the plurality of boards. Further, the DA emulation corresponding to the remote board can be enabled to destage the write data to the storage device.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business entity, e.g., a bank, can use a distributed storage system to store and manage data. For example, the storage system can include a storage array that links multiple physical storage devices, e.g., hard-disk drives (HDDs) and solid-state drives (SSDs). Further, the storage array can include several storage engines that perform data management services. Additionally, each engine can include a pair of boards with logical and hardware elements configured to one or more data storage services. For example, data storage services can include creating, reading, updating, deleting data, and the like.

The distributed storage system can also include one or more host machines (e.g., servers) that host business applications. Business applications can create data that requires storage. Additionally, the business application can require data stored by the storage array. Thus, the host machines can transmit input/output (IO) messages that include, e.g., read or write requests. The storage array can receive an IO message via one of its boards. Upon receiving, e.g., IO messages with write requests, current naïve techniques pass messages between components within a board, boards within an engine, or across engines to destage (i.e., write) data from the IO message's payload to one of the storage array's physical storage devices. However, the current message-passing techniques increase latency (e.g., the storage array's response times) and consume significant memory resources.

Advantageously, embodiments of the present disclosure reduce a storage array's latency using message-free load-balancing techniques described in greater detail herein.

Figure 1:
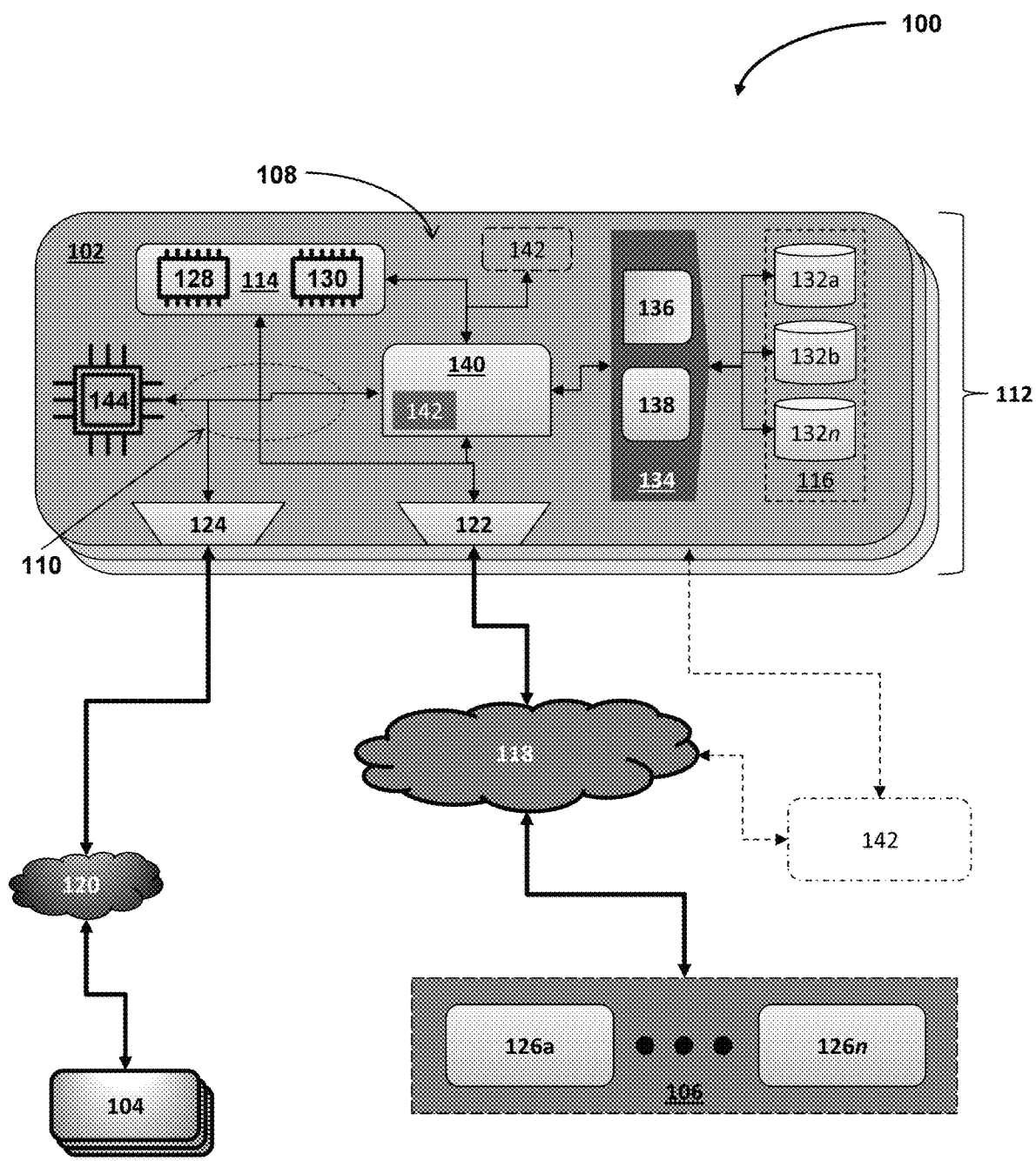
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112 that includes the storage array 102 and one or more other storage arrays.

In embodiments, the storage array 102, components 108, and remote system 104 can include a variety of proprietary or commercially available single or multiprocessor systems (e.g., parallel processor systems). Single or multiprocessor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multiprocessor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that controls access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
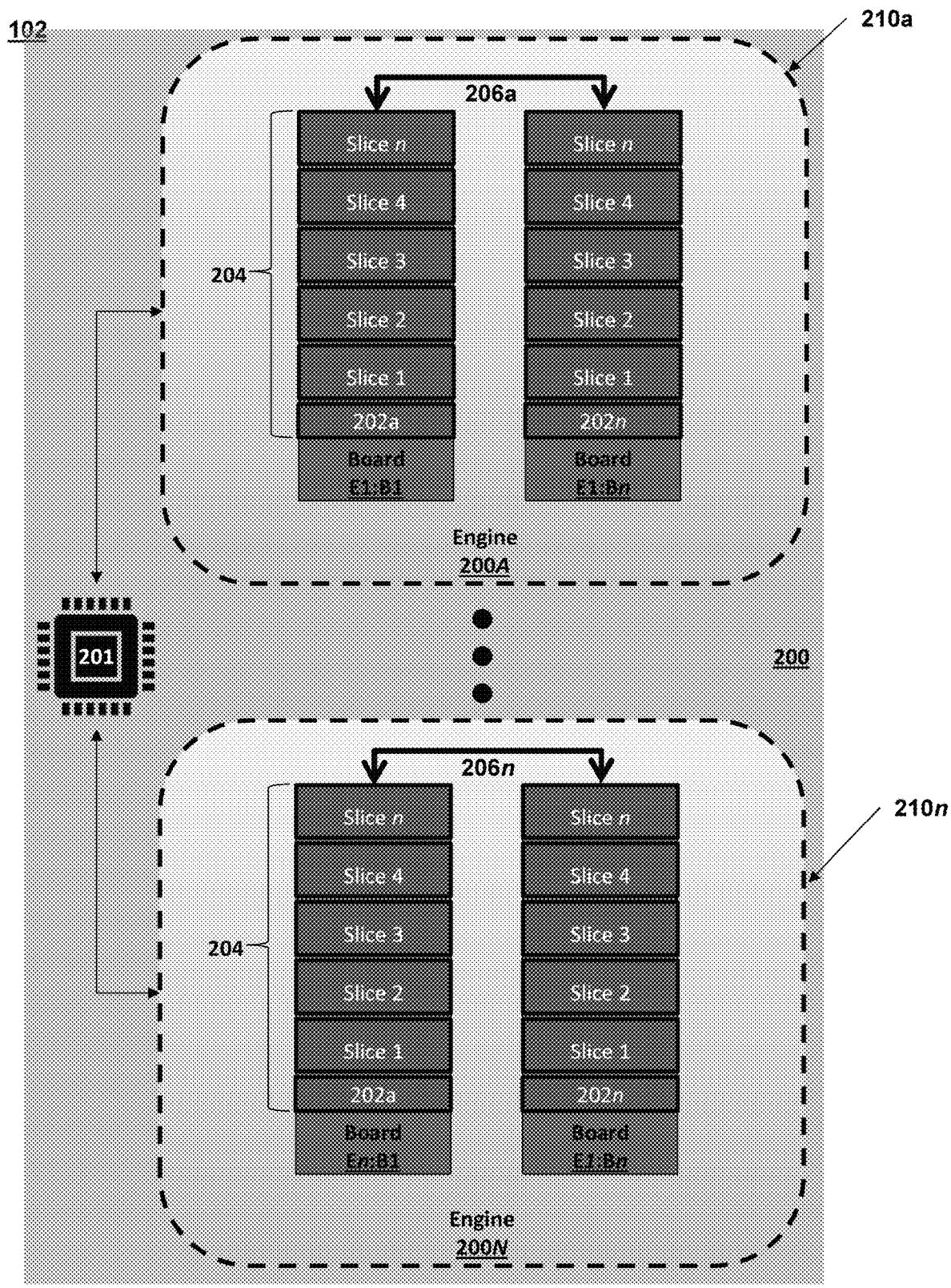
FIG. 2 is a block diagram of a storage engine in accordance with embodiments of the present disclosure.

Regarding FIG. 2, the storage array 102 can include engines 200, including logic, circuitry, and hardware that perform storage services. For example, the storage array 102 can house each engine 200A-N in a corresponding housing 210a-n (e.g., shelves). Furthermore, each engine 200A-N can include boards (e.g., director boards) E1:B1-E1:Bn, En:B1-En: Bn that include one or more emulations of the storage array's components 108 of FIG. 1. For example, the boards E1:B1-E1:Bn, En:B1-En:Bn can include slices 1-n, each emulating one of the components 108. Further, the engines 200A-n can include corresponding shared board-level memory 206a-n. Additionally, the boards E1:B1-E1: Bn, En:B1-En:Bn can include corresponding shared slice-level memory 202a-n (e.g., DRAM).

Figure 3:
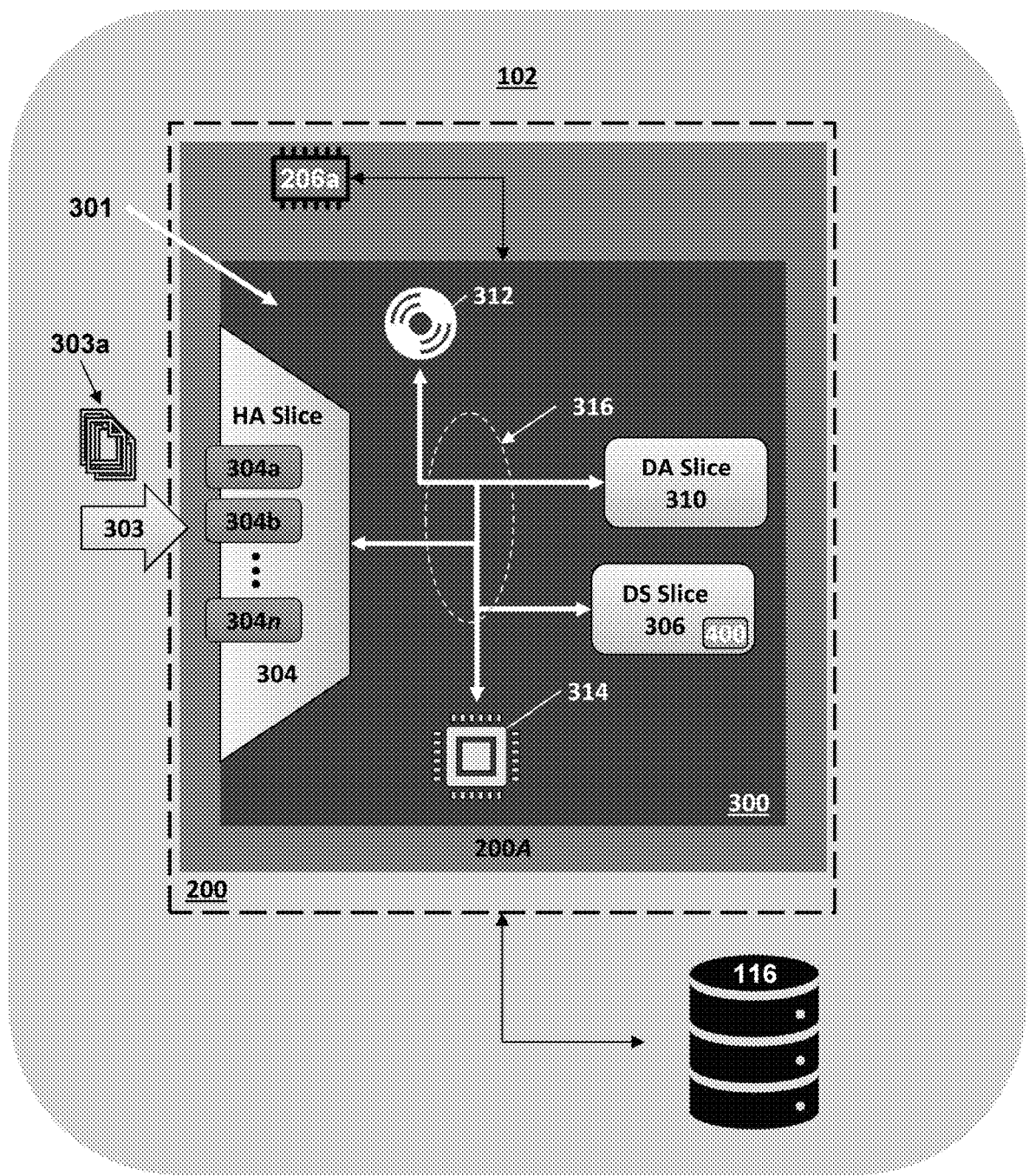
FIG. 3 is a block diagram of a storage engine board in accordance with embodiments of the present disclosure.

Regarding FIG. 3, the engine 200A can include a director board 300 that is substantially similar to boards E1:B1-E1: Bn of FIG. 2. For example, the director board 300 can include slices 301, emulating certain storage array components (e.g., the components 108 of FIG. 1). Additionally, the director board 300 can include fabric 316, interconnecting the slices 301. Further, the director board 300 can include a slice-level shared memory 314 (e.g., substantially similar to shared slice-level memory 202a-n of FIG. 2) that stores slice-level storage-related information. Specifically, the slices 301 can share information by storing their corresponding slice-level storage-related information in the slice-level shared memory 314. Additionally, the engine 200A can include a board-level shared memory 206a coupled to the engine's boards, e.g., board 300 and another board (e.g., board E1:Bn of FIG. 2). For instance, the board 300 can share storage-related information corresponding to one or more of its slices 1-n with another board by storing the information in the board-level shared memory 206a. Likewise, the engines 200 can include an engine-level shared memory 201, enabling boards to share storage-related information between boards on different engines.

Further, the director board 300 can include HA slice 304 configured to receive an IO workload 303, including several IO messages 303a. For example, the HA slice 304 can include ports 304a-n that include corresponding network addresses. Additionally, IO messages 303a in the IO workload 303 can include a destination address corresponding to a port's network address. In embodiments, the IO workload 303 can define IO messages 303a received during a given temporal window (e.g., duration of time). For example, the IO messages 303a correspond to all IO messages received by the storage array 102 or the director board 300 during the given temporal window. Further, the HA slice 304 can include logic, hardware, and circuitry configured to perform network adapter services related to receiving messages from a network (e.g., SAN 118 of FIG. 1).

In embodiments, the HA slice 304 can direct IO messages 303a with write requests to a data services (DS) slice 306 (e.g., an emulation of the EDS 140 of FIG. 1) that includes logic, hardware, and circuitry for processing write requests. Specifically, the DS slice 306 can process write requests based on one or more activity-related and resource-consumption-related metrics (collectively, telemetry metrics) collected by a daemon(s) 312. The telemetry metrics can include memory, fabric, and processor cycle usage metrics. Thus, the daemon(s) 312 can include logic and circuitry configured to monitor the telemetry metrics of the slices 301, fabric 316, and slice-level shared memory 314. For example, the daemon(s) 312 can maintain a log of telemetry metric records according to a reporting schedule. The reporting schedule can specify a start, duration, or end of one or more data collection windows.

In embodiments, the DS slice 306 can include a destage controller 400 (e.g., substantially similar to controller 142 of FIG. 1) that selects and directs the write requests to a local DA slice (e.g., DA slice 310), a local board's DA slice (e.g., a board on engine 200A), or a remote DA slice (e.g., a DA slice on a remote engine like the engine 200N of FIG. 2). Further, the selected DA slice destages data corresponding to the write request to persistent storage 116, as described in greater detail below.

Figure 4:
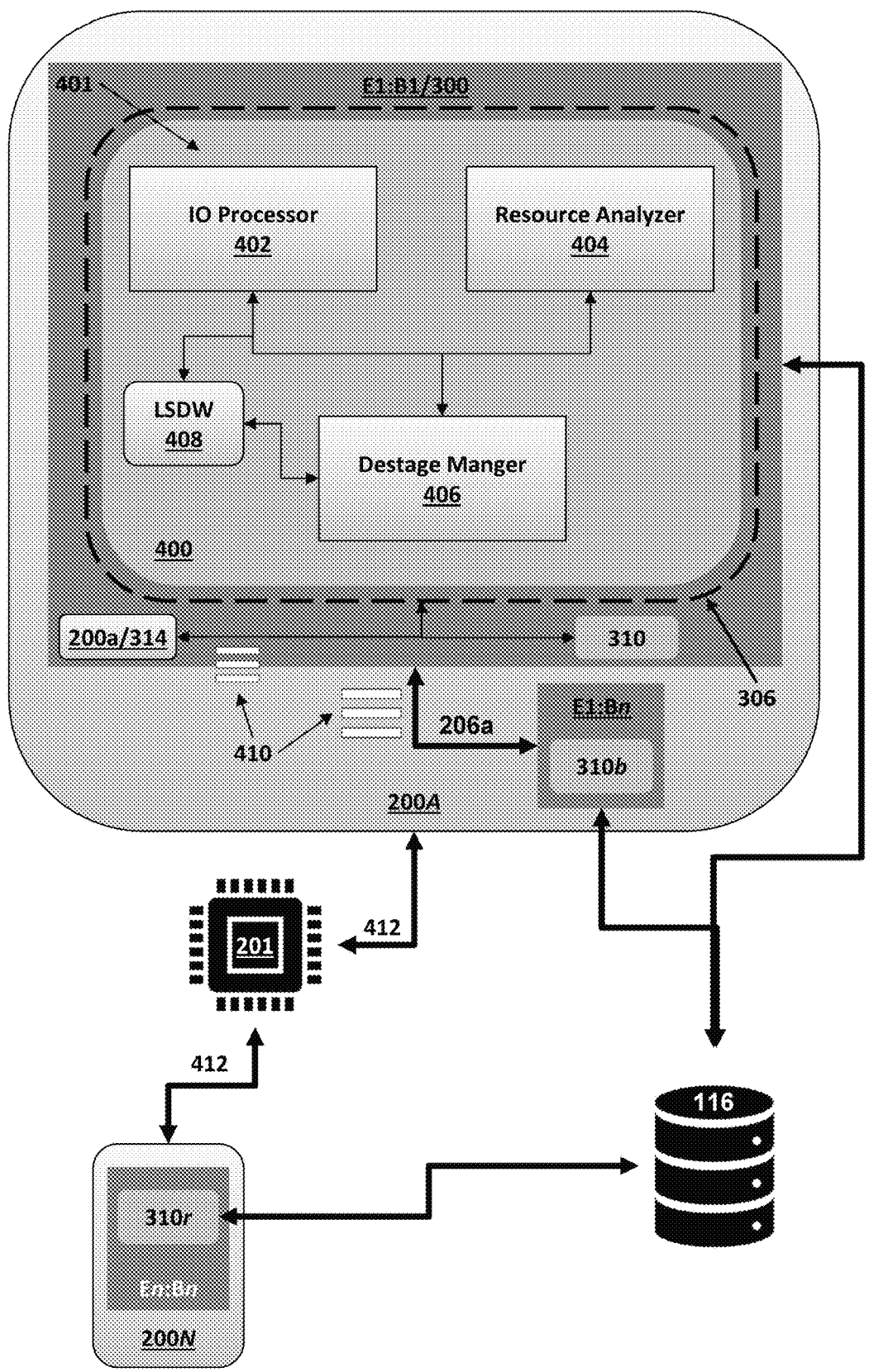
FIG. 4 is a block diagram of a controller in accordance with embodiments of the present disclosure.

Regarding FIG. 4, an HA slice (e.g., slice 304 of FIG. 3) residing on a director board E1:B1/300 of a storage engine 200A can pass IO messages (e.g., messages 303a of FIG. 3) to a local slice (e.g., a slice on the same board) like DS slice 306. The DS slice 306 includes a destage controller 400 with logic, hardware, and circuitry elements 401 that perform one or more destage storage services.

In embodiments, the destage controller 400 includes an IO processor 402 that determines one or more characteristics corresponding to each IO message. Specifically, the characteristics can include a size, type, destination, target storage, and the like corresponding to each IO message. For example, the IO processor 402 can determine that some IO messages include write requests by parsing their metadata. Further, the IO processor 402 can generate a destage job using the write request. Additionally, the IO processor 402 can add the destage job as a record in a local synchronous write destage (LSWD) queue 408.

Additionally, the destage controller 400 can include a resource analyzer 404 that obtains telemetry metric measurements corresponding to the slices 1-N/301, fabric 316, and slice-level shared memory 200a/314 from the daemon(s) (e.g., daemon(s) 312 of FIG. 3). Further, the resource analyzer 404 can analyze the telemetry metric measurements to determine whether any utilization metrics of the telemetry metric measurements exceed corresponding thresholds. In embodiments, the resource analyzer 404 can dynamically establish the thresholds using historical and current telemetry metric measurements. In other embodiments, the thresholds can be predefined.

In embodiments, the resource analyzer 404 can use the telemetry metric measurements to determine whether the memory or processor cycle utilizations of the DA slice 310 exceed corresponding thresholds. Likewise, the resource analyzer 404 can determine whether slice utilization of the board's fabric (e.g., the fabric 316 of FIG. 3) exceeds a corresponding threshold. Further, the resource analyzer 404 can obtain memory, processor cycle, and fabric utilization corresponding to a local board (e.g., board E1:Bn of FIG. 2) via board-level shared memory 206a. Similarly, the resource analyzer 404 can obtain memory, processor (e.g., CPU) cycle, and fabric utilization corresponding to a remote board (e.g., board En:Bn of FIG. 2) via an RDMA link 412 to an engine-level shared memory 201 (e.g., a global memory).

In embodiments, the destage controller 400 can include a destage manager 406 that directs destage job records from the LSWD queue 408 to a local DA slice 310, local board DA slice 310b on a local board (e.g., board E1:Bn), or a remote DA slice 310r on board En:Bn on the remote engine 200N. Specifically, the destage manager 406 can determine a performance and resource cost associated with directing each destage job record from the LSDW queue 408 to the local DA slice 310, local board DA slice 310b, or remote DA slice 310r. The destage manager 406 can normalize the memory and processor cycle utilization metrics of the DA slices 310, 310b, 310r, and the fabric utilization metrics of the director boards E1:B1-En:Bn by applying corresponding weights to each metric. For example, the destage manager 406 can determine the performance and resource cost using the equation (EQ. 1) below.

$$\text{Cost} = CPU \text{ cycle usage}_{Boar} \times W_1 +$$
$$\text{Fabric bandwidth usage}_{Boar} \times W_2 + \text{Memory bandwidth usage}_{Board} \times W_3$$

Thus, the destage manager 406 can direct the destage job record to a DA slice with the lowest cost.

Suppose, for example, the DA slice 310 has the lowest cost. Then, the destage manager 406 can issue a message with a copy of the destage job record to the DA slice 310 or pass a pointer 410 to the destage job record for access by the DA slice 310 based on respective messaging and pointer passing costs.

Suppose, for example, the remote DA slice 310r has the lowest cost. Then, the destage manager can pass a pointer 410 to the destage job record to a globally accessible memory 201 using an RDMA link 412. Thus, the remote DA slice 310r can use the pointer 410 to destage its corresponding data to persistent storage 116.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 5:
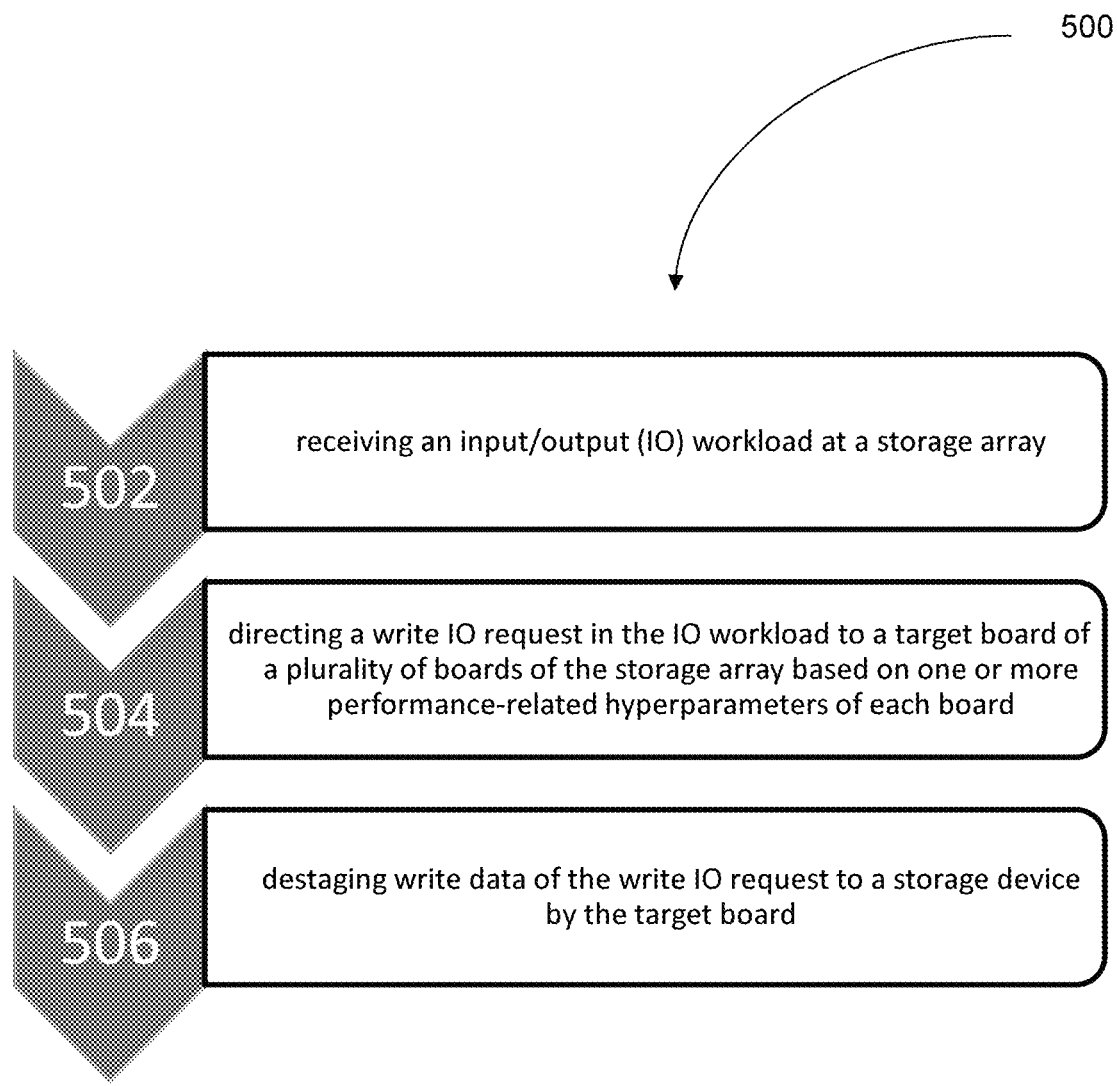
FIG. 5 is a flow diagram of a method for distributing write destaging amongst a storage array's boards per embodiments of the present disclosure.

Regarding FIG. 5, a method 500 relates to distributing write destaging amongst a storage array's boards. In embodiments, the controller 142 of FIG. 1 can perform all or a subset of operations corresponding to method 500.

For example, the method 500, at 502, can include receiving an input/output (IO) workload at a storage array. Additionally, at 504, the method 500 can include directing a write IO request in the IO workload to a target board of a plurality of boards of the storage array based on one or more performance-related hyperparameters of each board. Further, the method 500, at 506, can include destaging write data of the write IO request to a storage device by the target board.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs), or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
receiving an input/output (IO) workload at a storage array;
directing a write IO request in the IO workload to a target board of a plurality of boards of the storage array based on one or more performance-related hyperparameters of each board;
establishing a shared local memory for each board of the plurality of boards;
enabling each board's emulations to access their corresponding board's local memory; and
destaging write data of the write IO request to a storage device by the target board.

2. The method of claim 1, further comprising:
establishing a shared board-level memory between each of the plurality of boards; and
enabling data services (DS) and disk adapter (DA) emulations of each of the plurality of boards to access the shared board-level memory.

3. The method of claim 1, further comprising:
establishing a local synchronous write destage (LSWD) queue for each of the plurality of boards; and
queueing the IO write request in the LSWD corresponding to a subject board of the plurality of boards that received the IO write request.

4. The method of claim 3, further comprising:
determining the one or more performance-related hyperparameters corresponding to a disk adapter (DA) emulation of the subject board; and
determining the one or more performance-related hyperparameters corresponding to the DA emulation of each of the plurality of boards.

5. The method of claim 3, further comprising:
measuring a fabric utilization corresponding to the subject board and each of the plurality of boards.

6. The method of claim 5, further comprising:
measuring a DA emulation memory utilization corresponding to the subject board and each of the plurality of boards; and
measuring a DA emulation processor cycle utilization corresponding to the subject board and each of the plurality of boards.

7. The method of claim 6, further comprising:
generating a write destage schedule based on the measured fabric utilization, DA emulation memory utilization, and DA emulation processor cycle utilization corresponding to the subject board and each of the plurality of boards.

8. The method of claim 7, further comprising:
using a destage controller corresponding to the subject board, assigning the DA corresponding to the subject board to destage write data corresponding to the write IO request based on the write destage schedule, wherein the subject board corresponds to the target board; and
based on the measured fabric utilization, DA emulation memory utilization, and DA emulation processor cycle utilization corresponding to the subject board:
passing the write IO request to the DA emulation of the subject board, or
storing the write IO request in the LSWD queue in a shared memory of the subject board; and
destaging the write data to the storage device using the DA emulation corresponding to the subject board.

9. The method of claim 7, further comprising:
using a destage controller corresponding to the subject board, assigning a remote board of the plurality of boards to destage write data corresponding to the write IO request based on the write destage schedule;
passing a pointer to the write IO request corresponding to a location in a shared memory of the subject board to shared board-level memory between each of the plurality of boards; and
enabling the DA emulation corresponding to the remote board to destage the write data to the storage device.

10. A system with a memory and a processor, the system configured to:
receive an input/output (IO) workload at a storage array;
direct a write IO request in the IO workload to a target board of a plurality of boards of the storage array based on one or more performance-related hyperparameters of each board;
establish a shared local memory for each board of the plurality of boards;
enable each board's emulations to access their corresponding board's local memory; and
destage write data of the write IO request to a storage device by the target board.

11. The system of claim 10, further configured to:
establish a shared board-level memory between each of the plurality of boards; and
enable a data services (DS) emulation and disk adapter (DA) of each of the plurality of boards to access the shared board-level memory.

12. The system of claim 10, further configured to:
establish a local synchronous write destage (LSWD) queue for each of the plurality of boards; and
queue the IO write request in the LSWD corresponding to a subject board of the plurality of boards that received the IO write request.

13. The system of claim 12, further configured to:
determine the one or more performance-related hyperparameters corresponding to a disk adapter (DA) emulation of the subject board; and
determine the one or more performance-related hyperparameters corresponding to the DA emulation of each of the plurality of boards.

14. The system of claim 12, further configured to:
measure a fabric utilization corresponding to the subject board and each of the plurality of boards.

15. The system of claim 14, further configured to:
measure a DA emulation memory utilization corresponding to the subject board and each of the plurality of boards; and
measure a DA emulation processor cycle utilization corresponding to the subject board and each of the plurality of boards.

16. The system of claim 15, further configured to:
generate a write destage schedule based on the measured fabric utilization, DA emulation memory utilization, and DA emulation processor cycle utilization corresponding to the subject board and each of the plurality of boards.

17. The system of claim 16, further configured to:
use a destage controller corresponding to the subject board, assigning the DA corresponding to the subject board to destage write data corresponding to the write IO request based on the write destage schedule, wherein the subject board corresponds to the target board; and
based on the measured fabric utilization, DA emulation memory utilization, and DA emulation processor cycle utilization corresponding to the subject board:
pass the write IO request to the DA emulation of the subject board, or
store the write IO request in the LSWD queue in a shared memory of the subject board; and
destage the write data to the storage device using the DA emulation corresponding to the subject board.

18. The system of claim 16, further configured to:
use a destage controller corresponding to the subject board, assigning a remote board of the plurality of boards to destage write data corresponding to the write IO request based on the write destage schedule;
pass a pointer to the write IO request corresponding to a location in a shared memory of the subject board to shared board-level memory between each of the plurality of boards; and
enable the DA emulation corresponding to the remote board to destage the write data to the storage device.

* * * * *